(12) United States Patent
Barfoot et al.

(10) Patent No.: US 11,366,244 B2
(45) Date of Patent: Jun. 21, 2022

(54) DISTRIBUTED ACOUSTIC SENSING SYSTEM WITH A POLARIZATION CONTROL DEVICE FOR IMPROVING SIGNAL-TO-NOISE RATIO

(71) Applicant: HALLIBURTON ENERGY SERVICES, INC., Houston, TX (US)

(72) Inventors: David Andrew Barfoot, Houston, TX (US); Kwang Il Suh, Los Angeles, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 533 days.

(21) Appl. No.: 16/478,339

(22) PCT Filed: Feb. 23, 2017

(86) PCT No.: PCT/US2017/019048
§ 371 (c)(1),
(2) Date: Jul. 16, 2019

(87) PCT Pub. No.: WO2018/156132
PCT Pub. Date: Aug. 30, 2018

(65) Prior Publication Data
US 2019/0369276 A1   Dec. 5, 2019

(51) Int. Cl.
*G01V 1/22* (2006.01)
*E21B 49/00* (2006.01)
(Continued)

(52) U.S. Cl.
CPC .............. *G01V 1/226* (2013.01); *E21B 49/00* (2013.01); *G01V 1/308* (2013.01); *E21B 43/26* (2013.01);
(Continued)

(58) Field of Classification Search
CPC ................... G01V 1/226; G01V 1/308; G01V 2210/1234; G01V 2210/1429; E21B 49/00; G01H 9/004
See application file for complete search history.

(56) References Cited

U.S. PATENT DOCUMENTS

| | | | | |
|---|---|---|---|---|
| 5,023,950 A | * | 6/1991 | Tsushima | H04L 25/4925 398/187 |
| 5,396,361 A | * | 3/1995 | Sasaki | H04B 10/572 398/1 |

(Continued)

FOREIGN PATENT DOCUMENTS

| | | |
|---|---|---|
| GB | 2222247 A | 2/1990 |
| WO | 2015130300 A1 | 9/2015 |

OTHER PUBLICATIONS

Yan et al. "Distributed Optical Fiber Sensing Assisted by Optical Communication Techniques," Journal of Lightwave Technology, vol. 39, No. 12 (Year: 2021).*

(Continued)

*Primary Examiner* — John Fitzgerald
(74) *Attorney, Agent, or Firm* — Kilpatrick Townsend & Stockton LLP (57) ABSTRACT

A backscattered signal can be received from a sensing fiber that extends into a wellbore. The backscattered signal can have been generated based on an optical signal launched into the sensing fiber. A first delayed signal, a second delayed signal, a first non-delayed signal, and a second non-delayed signal can be generated from the backscattered signal. A polarization control device can shift a polarization of the first delayed signal or the first non-delayed signal. A first demodulated signal can be determined based on the first delayed signal and the first non-delayed signal. A second demodulated signal can be determined based on the second delayed signal and the second non-delayed signal. Data (Continued)

about an environment of the wellbore can be determined by processing the first demodulated signal and the second demodulated signal to compensate for noise in the first demodulated signal or the second demodulated signal.

20 Claims, 6 Drawing Sheets

(51) Int. Cl.
  *G01V 1/30* (2006.01)
  *E21B 43/26* (2006.01)
(52) U.S. Cl.
  CPC .............. *G01V 2210/1234* (2013.01); *G01V 2210/1429* (2013.01)

(56) References Cited

U.S. PATENT DOCUMENTS

| | | |
|---|---|---|
| 7,271,884 B2 | 9/2007 | Payton et al. |
| 7,668,411 B2 | 2/2010 | Davies et al. |
| 7,764,363 B2 | 7/2010 | Lewis et al. |
| 9,140,582 B2 | 9/2015 | Parker et al. |
| 9,170,149 B2 | 10/2015 | Hartog et al. |
| 9,869,795 B2 * | 1/2018 | Jaaskelainen ............ G01V 1/42 |
| 10,309,825 B2 * | 6/2019 | Suh ........................ G01V 1/226 |
| 11,111,780 B2 * | 9/2021 | Barfoot ............... G01M 5/0025 |
| 2007/0278389 A1 | 12/2007 | Ajgaonkar et al. |
| 2008/0198367 A1 | 8/2008 | Chang et al. |
| 2011/0088462 A1 | 4/2011 | Samson et al. |
| 2011/0292371 A1 | 12/2011 | Chang et al. |
| 2014/0176937 A1 | 6/2014 | Liu et al. |
| 2014/0255023 A1 * | 9/2014 | Kishida ................ H04B 10/071 398/21 |
| 2015/0308864 A1 * | 10/2015 | Paulsson .................. G01V 1/48 73/152.16 |
| 2016/0146661 A1 * | 5/2016 | Martin ............... G01D 5/35361 356/482 |
| 2019/0353029 A1 * | 11/2019 | Barfoot ............... G01M 5/0025 |

OTHER PUBLICATIONS

Barfoot, "Efficient Vertical Seismic Profiling using Fiber-Optic Distributed Acoustic Sensing and Real-Time Processing", Second EAGE Workshop on Borehole Geophysics., 2013, 3 pages.
PCT/US2017/019048, "International Search Report and Written Opinion", dated Nov. 23, 2017, 11 pages.

* cited by examiner

DISTRIBUTED ACOUSTIC SENSING SYSTEM WITH A POLARIZATION CONTROL DEVICE FOR IMPROVING SIGNAL-TO-NOISE RATIO

TECHNICAL FIELD

The present disclosure relates generally to a distributed acoustic sensing system for interrogating a wellbore and, more particularly (although not exclusively), to a distributed acoustic sensing system with a polarization control device for improving a signal-to-noise ratio.

BACKGROUND

A distributed acoustic sensing system can be used in a well system to determine data about an environment of a wellbore. The distributed acoustic sensing system can include an optical source for transmitting an optical signal through an optical fiber that extends into a wellbore and an optical receiver for receiving a backscattered optical signal generated by the optical signal propagating through the optical fiber. The backscattered optical signal can be processed by the distributed acoustic sensing system to determine the data about the environment of the wellbore. Portions or channels of the backscattered signal can include noise such that the portion of the backscattered signal is considered faded and unsuitable for determining the data. In some examples, a faded channel can exist in a backscattered signal that experiences destructive noise such that a power level of the channel is below a threshold value. In some aspects, the threshold value can be determined based on a desired quality (e.g., accuracy) of the data.

A distributed acoustic sensing system can be used to measure the effects of a hydraulic fracturing operation. Hydraulic fracturing can include pumping a treatment fluid that includes a proppant mixture into a wellbore formed through the subterranean formation. The treatment fluid can create perforations in the subterranean formation and the proppant mixture can fill the perforations to prop the perforations open. The flow of the treatment fluid through the wellbore can create acoustics that vibrate the sensing fiber and cause measurable changes in a backscattered optical signal. The distributed acoustic sensing system can detect these changes and determine the intensity and location of the source of the acoustics based on the backscattered signal. The intensity and location of the source of the acoustics can be used by the distributed acoustic sensing system to determine data about the environment of the wellbore.

DETAILED DESCRIPTION

Certain aspects and features relate to a distributed acoustic sensing system ("DAS") that includes a polarization control device (e.g., a polarization scrambler) for improving a signal-to-noise ratio of the DAS usable with respect to a wellbore. A DAS can be used to determine data about an environment of the wellbore and improving the signal-to-noise ratio can improve the accuracy of the data. A DAS can include a compensator for receiving a backscattered signal from a sensing fiber. The compensator can include a polarization control device for shifting a polarity of a version of the backscattered signal. The polarization-shifted version of the backscattered signal can be used by an interferometer in the compensator to detect a demodulated signal that is de-correlated with another demodulated signal determined by the compensator. Data about the environment of the wellbore can be determined by processing the de-correlated demodulated signals to compensate for noise in one of the de-correlated demodulated signals.

In some aspects, a DAS may include an interrogation device positioned at a surface proximate to a wellbore and coupled to an optical fiber extending from the surface into the wellbore. An optical source of the interrogation device may transmit an optical signal, or an interrogation signal, downhole into the wellbore through the optical fiber. Backscattering of the optical signal can occur based on the optical signal interacting with the optical fiber and can cause the optical signal to propagate back toward an optical receiver in the interrogation device. In some examples, different backscattering can occur based on acoustics from the environment causing a vibration in the optical fiber or thermal changes (e.g., changes in temperature) causing thermal expansion of the cable and movement or expansion of the optical fiber. The acoustics from the environment and thermal changes may have different frequency content. The optical signal can be analyzed to determine real-time data about an environment of the wellbore, including intensity and location of the acoustics generated downhole or changes in temperature downhole. A DAS can detect signals anywhere along a length of optical fiber in substantially real time (e.g., real time can be limited by the travel time of the optical pulse from the DAS signal transmitter to the end of the optical fiber and back to the DAS optical receiver). For example, the DAS can measure real-time data about acoustics produced by treatment fluid flowing through perforations in the subterranean formation during a hydraulic fracturing process. The real-time data can be used to determine expected flow rates at each perforation cluster in a wellbore.

The power of a backscattered signal can be weak (e.g., 1 millionth of the peak power of the interrogation signal). The signal to noise ratio of measurements can depend on the coherent portion of the backscattered power received by an optical receiver. The coherent portion of the backscattered signal can vary significantly because the backscattered signal can depend on the ensemble sum of the backscattered light occurring between two locations or segments of the sensing fiber that interferometricaly recombine. The resulting coherence of any of the measurements can range by more than two orders of magnitude.

In some aspects, the compensator can include splitters and a delay coil for generating time delayed versions of the backscattered signal and non-delayed versions of the backscattered signal. The compensator can also include interferometers that can each determine or detect a demodulated signal based on a delayed version of the backscattered signal and a non-delayed version of the backscattered signal. The compensator can also include a polarization control device for shifting a polarity of one of the versions of the backscattered signal used by an interferometer such that the interferometer detects a demodulated signal with noise that is de-correlated from noise in a demodulated signal detected by another interferometer. De-correlated demodulated signals can have different signal-to-noise ratios and the noise can be mixed into different portions of the demodulated signals. In some examples, using the demodulated signal with the higher signal-to-noise ratio can mitigate noise by determining the data based on a demodulated signal with a higher signal-to-noise ratio. In additional or alternative examples, the de-correlated demodulated signals can be simultaneously processed by averaging the demodulated signals together using a weighted average such that portions of the demodulated signals are compared and the portion with the higher signal-to-noise ratio is used in determining data. More de-correlated demodulated signals can result in more noise mitigation.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
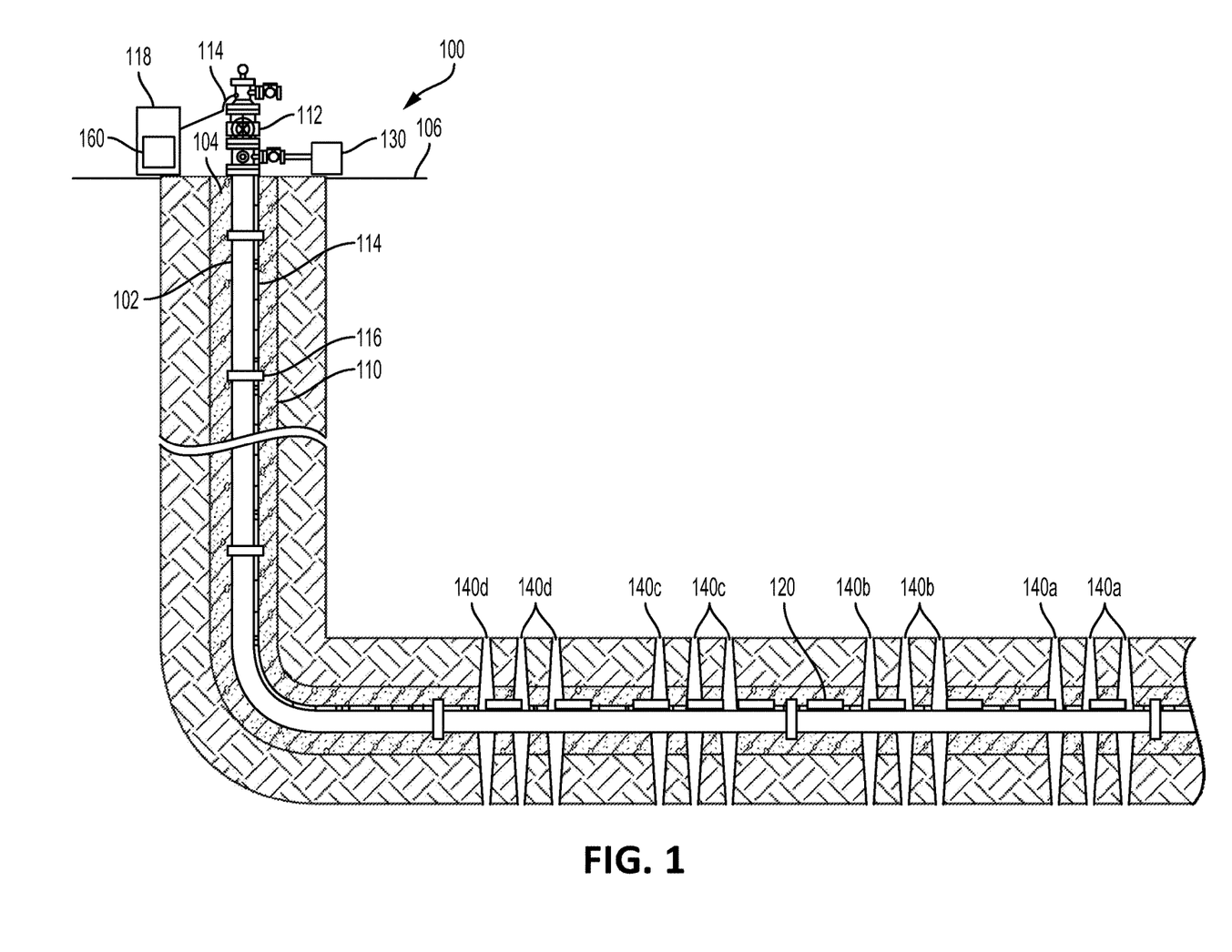
FIG. 1 is a diagram of an example of a well system including a distributed acoustic sensing system with a polarization control device for improving a signal-to-noise ratio according to one aspect of the present disclosure.

FIG. 1 illustrates an example of a well system 100 that includes a DAS according to some aspects of the present disclosure. The well system 100 includes a casing string 102 positioned in a wellbore 104 that has been formed in a surface 106 of the earth. The well system 100 may have been constructed and completed in any suitable manner, such as by use of a drilling assembly having a drill bit for creating the wellbore 104. The casing string 102 may include tubular casing sections connected by end-to-end coupling bands 116. In some aspects, the casing string 102 may be made of a suitable material such as steel. Within the wellbore 104, cement 110 may be injected and allowed to set between an outer surface of the casing string 102 and an inner surface of the wellbore 104.

At the surface 106 of the wellbore 104, a tree assembly 112 may be joined to the casing string 102. The tree assembly 112 may include an assembly of valves, spools, fittings, etc. to direct and control the flow of fluid (e.g., oil, gas, water, etc.) into or out of the wellbore 104 within the casing string 102. For example, a pump 130 can be coupled to the tree assembly 112 for injecting a treatment fluid into the wellbore 104 as part of a hydraulic fracturing process. The treatment fluid can form the perforation clusters 140a-d through the outer surface of the casing string 102, the cement 110, and a surrounding subterranean formation. Each perforation cluster 140a-d can include one or more fractures and the treatment fluid can include proppant for propping the fractures open such that production fluid can flow from the surrounding subterranean formation into the wellbore 104.

Optical fibers 114 may be routed through one or more ports in the tree assembly 112 and extend along an outer surface of the casing string 102. The optical fibers 114 can include multiple optical fibers. For example, the optical fibers 114 can include one or more single-mode optical fibers or one or more multimode optical fibers. Each of the optical fibers 114 may include one or more optical sensors 120 along the optical fibers 114. The sensors 120 may be deployed in the wellbore 104 and used to sense and transmit measurements of an environment of the wellbore 104 or downhole conditions in the well system 100 to the surface 106. In some examples, the sensors 120 may measure acoustics generated from the environment generated as the treatment fluid from the pump 130 passes through one of the perforation clusters 140a-d. In additional or alternative examples, the sensors 120 may measure a temperature at one of the perforation clusters 140a. The optical fibers 114 may be retained against the outer surface of the casing string 102 at intervals by coupling bands 116 that extend around the casing string 102. The optical fibers 114 may be retained by at least two of the coupling bands 116.

The optical fibers 114 can be coupled to an interrogation subsystem 118. The interrogation subsystem 118 can be part of a DAS, a DTS, or a combination thereof. The interrogation subsystem 118 is positioned at the surface 106 of the wellbore 104. In some aspects, the interrogation subsystem 118 may be an opto-electronic unit that may include devices and components to interrogate sensors 120 coupled to the optical fibers 114. For example, the interrogation subsystem 118 may include an optical source, such as a laser device, that can generate optical signals to be transmitted through one or more of the optical fibers 114 to the sensors 120 in the wellbore 104. The interrogation subsystem 118 may also include an optical receiver to receive and perform interferometric measurements of backscattered optical signals from the sensors 120 coupled to the optical fibers 114.

Although FIG. 1 depicts the optical fibers 114 as being coupled to the sensors 120, the optical fibers 114 can form a sensing optical fiber and operate as a sensor. A sensing optical fiber can be remotely interrogated by transmitting an optical signal downhole through the optical fibers 114. In some examples, Rayleigh scattering from random variations of a refractive index in the optical waveguide can produce backscattered light. By measuring a difference in an optical phase of the scattering occurring at two locations along the optical fibers 114 and tracking changes in the phase difference over time, a virtual vibration sensor can be formed in the region between the two scattering location. By sampling the backscattered optical signals at a high rate (e.g., 100 MHz) the optical fibers 114 can be partitioned into an array of vibration sensors. In some aspects, the interrogation subsystem 118 can include a processing device for processing the backscattered optical signals to determine data about an environment of the wellbore 104. In additional or alternative aspects, the processing device can be separate from, but communicatively coupled to, the interrogation subsystem 118. For example, a processing device can be included in the pump 130 or a tool positioned downhole.

In this example, the interrogation subsystem 118 includes a polarization control device 160 for improving a signal-to-noise ratio and mitigating fading in the DAS. Some of the sensors 120 can respond to acoustics in the wellbore (e.g., acoustic signals generated by the treatment fluid passing through the perforation clusters 140a-d) and provide a backscattered optical signal based on the acoustics and the optical signal to the interrogation subsystem 118. The polarization control device 160 can shift a polarity of a version of the backscattered signal received from the optical fibers 114. By shifting the polarity of a version of the backscattered signal, the interrogation subsystem 118 can generate or detect de-correlated demodulated signals. A processing device can process the de-correlated demodulated signals to improve a signal-to-noise ratio and mitigate fading in the backscattered signal. In some examples, the processing device can combine the portions of each demodulated signal with an amount of fading below a threshold value. Improving the signal-to-noise ratio and mitigating the fading can allow the DAS to determine more accurate data representing the environment of the wellbore.

In some aspects, the well system 100 may also include one or more electrical sensors deployed using an electrical cable deployed similarly to the optical fibers 114. In additional or alternative aspects, the optical fibers 114 can be a hybrid opto-electrical cable housing both optical fibers and electrical conductors for electrical sensors.

Figure 2:
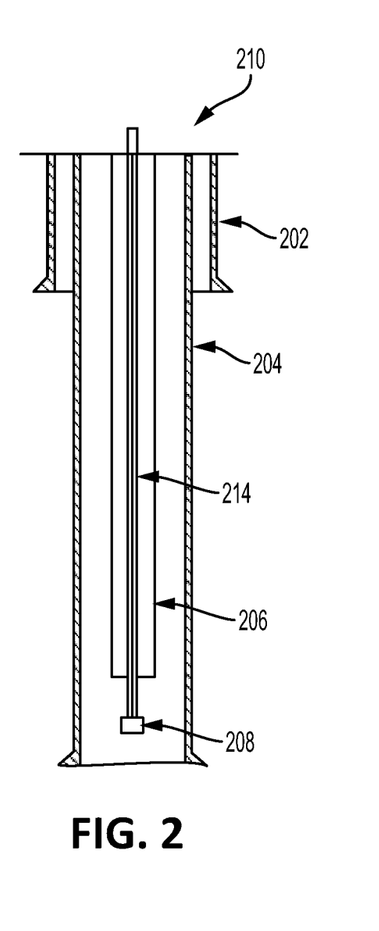
FIGS. 2-4 are schematic diagrams of examples of different types of wellbores each including a distributed acoustic sensing system with a phase modulator for mitigating faded channels according to one aspect of the present disclosure.
Figure 3:
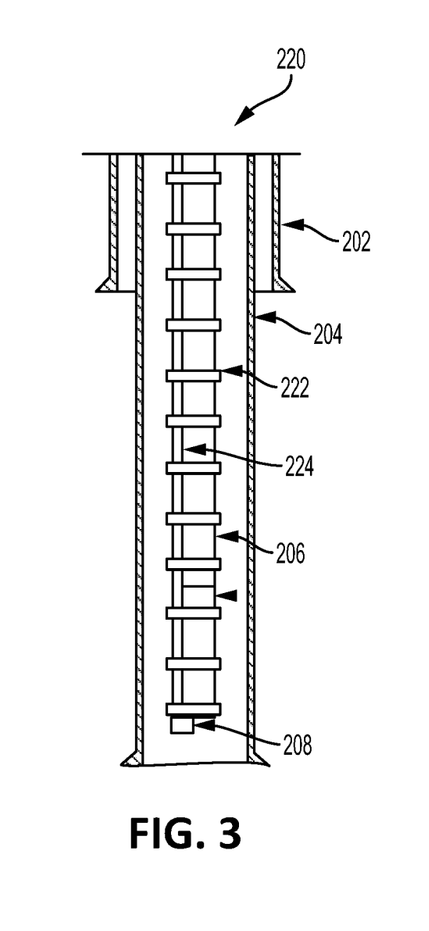
Figure 4:
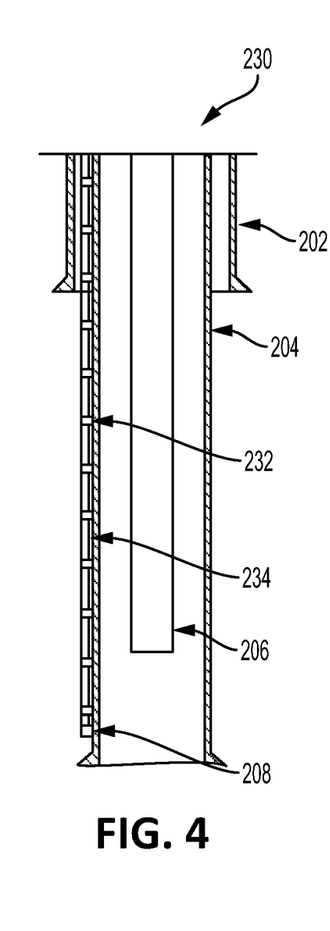

In some aspects, the optical fibers 114 can be positioned exterior to the casing string 102, but other deployment options may also be implemented. For example, FIGS. 2-4 depict schematic diagrams of a DAS being deployed in a variety of well systems 210, 220, 230.

Each of the well systems 210, 220, 230 include a production casing 204 extending through a surface casing 202 and a tubing string 206 extending through the production casing 204. The well system 210 includes optical fibers 214 extending through an inner area of the tubing string 206. The optical fibers 214 may extend through the tubing string 206 such that the optical fibers 214 can be removed independent of the tubing string 206. The well system 220 includes optical fibers 224 coupled to an outer surface of the tubing string 206 by coupling bands 222. The tubing string 206 can include coiled tubing and the optical fibers 224 can be coupled to the coiled tubing such that the optical fibers 214 can be removed with the coiled tubing. In some examples, a tail of the tubing string can extend below a deepest perforation. The well system 230 includes optical fibers 234 extending downhole between the surface casing 202 and the production casing 204. Coupling bands 232 can couple the optical fibers 234 to an exterior surface of the production casing 204.

Figure 5:
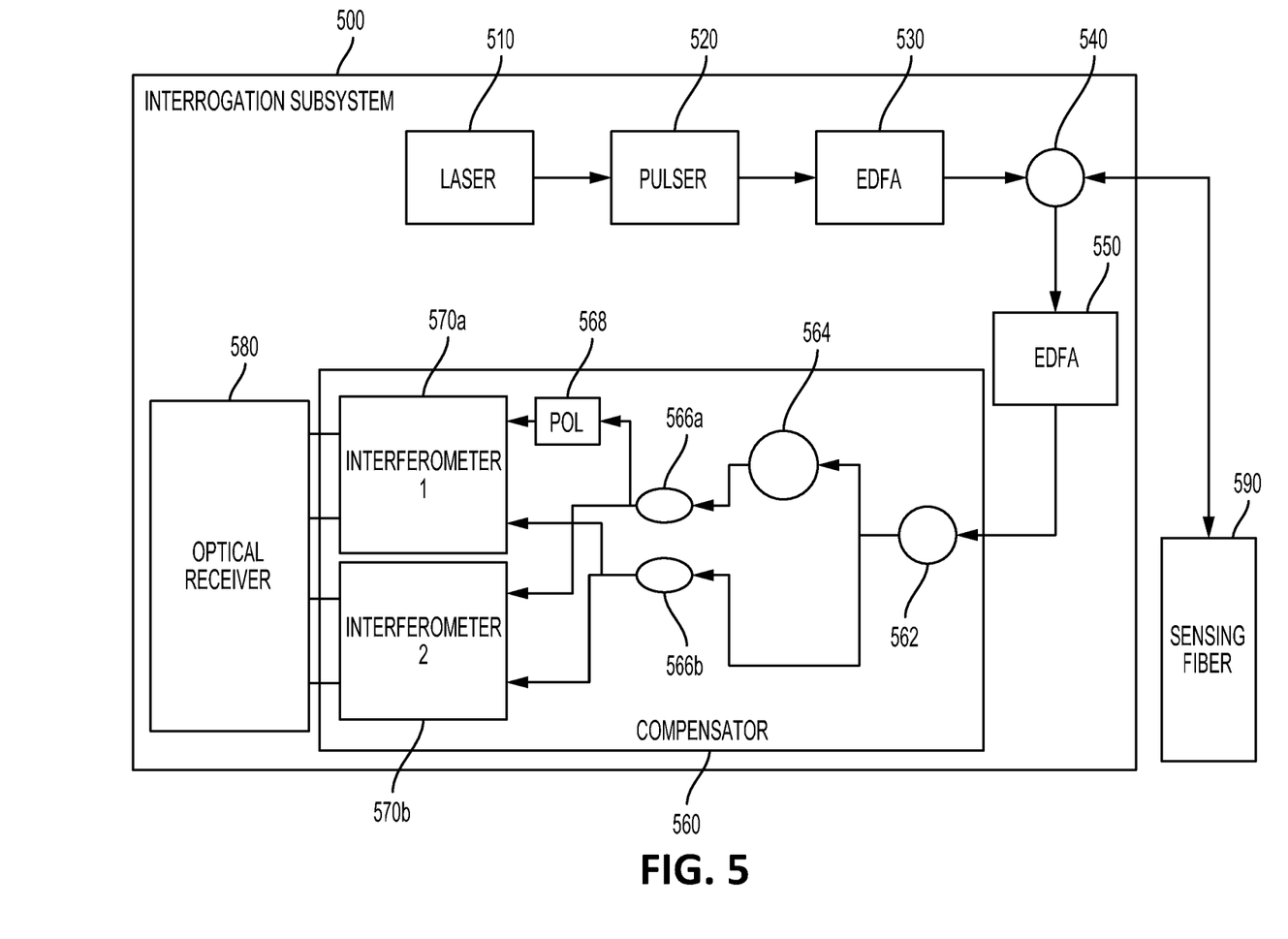
FIG. 5 is a block diagram of an example of a distributed acoustic sensing system with a polarization control device for improving a signal-to-noise ratio according to one aspect of the present disclosure.

FIG. 5 is a block diagram of a DAS that includes a polarization control device 568 for improving a signal-to-noise ratio of the DAS. The DAS can include an interrogation subsystem 500 and a sensing fiber 590. In some examples, the interrogation subsystem 500 can include the interrogation subsystem 118 in FIG. 1 and the sensing fiber 590 can include the optical fiber 114 in FIG. 1.

The interrogation subsystem 500 can include a laser 510, a pulser 520, a pair of erbium-doped fiber amplifier ("EDFA") 530, 550, a circulator 540, a compensator 560, and an optical receiver 580. The laser 510 can generate an optical signal, which can be separated into pulses by the pulser 520. The EDFA 530 can amplify the pulses and the circulator 540 can launch each pulse into the sensing fiber 590. The circulator 540 can also receive a backscattered signal in response to each pulse from the sensing fiber 590 and can direct each backscattered signal to the EDFA 550. The EDFA 550 can amplify each backscattered signal to compensate for splitting that can occur in the compensator 560. The compensator 560 can include splitters 562, 566a-b, a delay coil 564, a polarization control device 568, and interferometers 570a-b. The splitter 562 can split a backscattered signal output by the EDFA 550 into two versions. One version can pass through the time delay coil 564 and the version can be input to splitter 566a. The other version can be input directly to splitter 566b. Splitter 566a can split the time-delayed version into two time-delayed versions.

One of the time-delayed versions is an input for interferometer 2 570b. The polarization control device 568 can shift the polarity of the other time-delayed version and output a polarity-shifted time-delayed version as an input to interferometer 1 570a. Splitter 566b can split the non-delayed version into two non-delayed versions such that one non-delayed version is provided as input to each of the interferometers 570a-b. In some examples, the interferometers 570a-b can be 3×3 couplers, 90 degree hybrids, 4×4 couplers or any other devices that can demodulate optical phase using passive homodyne demodulation. The interferometers 570a-b can each use the time-delayed version and the non-delayed version to detect a demodulated signal. A demodulated signal detected by interferometer 1 570a can be de-correlated, in regards to noise, in comparison to a demodulated signal detected by interferometer 2 570b. In this example, each demodulated signal can include an in-phase and quadrature value that can be transmitted to optical receiver 580.

A processing device can be included in the optical receiver 580 or communicatively coupled to the interrogation subsystem 500 for processing the de-correlated demodulated signals to determine data about an environment of the wellbore. In some aspects, the processing device determines the data based on the demodulated signal with a higher signal-to-noise ratio. In additional or alternative aspects, the processing device averages the de-correlated demodulated signals using a weighted average based on the signal-to-noise of each demodulated signal. By processing demodulated signals generated from versions having a different polarization, the processing device can improve the signal-to-noise ratio and mitigate fading. In some examples, processing the de-correlated demodulated signals can provide a 2 to 3 dB improvement to the signal-to-noise ratio.

In this example, the compensator 560 includes splitters 562, 566a-b for splitting each backscattered signal twice. The EDFA 550 can compensate for the versions being input to the interferometers having a fourth of the power level of the backscattered signal received by the compensator 560 by outputting a backscattered signal with a power level that is four times the power level of the backscattered signal received at the EDFA 550.

In some examples, the polarization control device 568 can include a polarization scrambler, a polarization switch, or a depolarizer for manipulating the polarization state of a version of the backscattered signal. In some aspects, the polarization control device can include a coil of fiber with a sufficiently small diameter to induce stress on the fiber and cause birefringence. In additional or alternative aspects, the polarization control device 568 can include two lengths of polarization maintaining fiber spliced in different polarization orientation into the fiber lead between the splitter 566a and the interferometer 1 570a.

Although FIG. 5 depicts a block diagram of an optical phase based DAS having a single laser and a single polarization control device, other implementations are possible. In some examples, a DAS can include more than one laser or other optical sources for generating more than one optical signal and a DAS can include more than one compensator for each receiving a backscattered signal generated by the optical signals.

Figure 8:
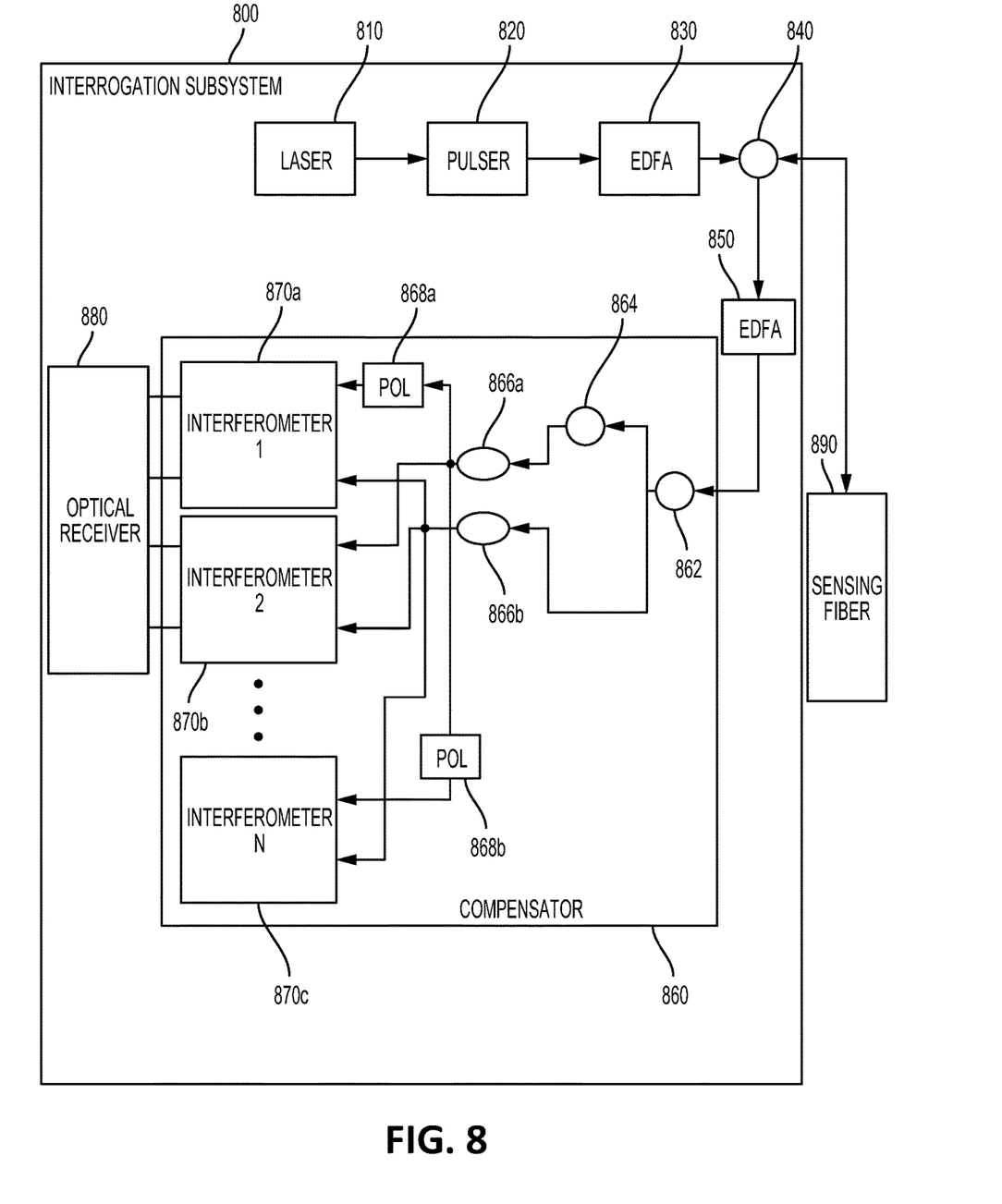
FIG. 8 is a block diagram of an example of a distributed acoustic sensing system with more than one polarization control device for improving a signal-to-noise ratio according to one aspect of the present disclosure.

FIG. 8 is a block diagram that depicts a DAS with an interrogation subsystem 800 that includes a compensator 860 with more than two interferometers 870a-c. The interrogation subsystem can include a laser 810, puller 820, a pair of EDFAs 850, a circulator 840, the compensator 860, and an optical receiver 880. Similar to the interrogation subsystem 500 in FIG. 5, the interrogation subsystem 800 can generate an optical signal that can be launched into a sensing fiber 890 that can extend into a wellbore. The circulator 840 can receive a backscattered signal in response to the optical signal from the sensing fiber 890 and can the backscattered signal to the EDFA 550. The EDFA 550 can amplify the backscattered signal to compensate for splitting that can occur in the compensator 860. The compensator 860 can include splitters 862, 866a-b, a delay coil 864, polarization control devices 868a-b, and interferometers 870a-c. The splitter 862 can split a backscattered signal output by the EDFA 850 into two versions. One version can pass through the time delay coil 864 and can be input to splitter 866a. The other version can be input directly to splitter 866b. Splitter 866a can split the time-delayed version into three or more time-delayed versions.

Two or more of the time-delayed versions can be input to one of the polarization control devices 868a-b, which can shift a polarization of the time-delayed versions. Splitter 566b can split the non-delayed version into three or more non-delayed versions. Each of the interferometers 870a-c can receive one of the time-delayed versions and the non-delayed versions and detect a demodulated signal based on the received time-delayed version and non-delayed version. The demodulated signals detected by the interferometers 870a-c can be de-correlated in regards to noise. A processing device can be included in the optical receiver 580 or communicatively coupled to the interrogation subsystem 500 for processing the de-correlated demodulated signals to determine data about an environment of the wellbore.

Figure 6:
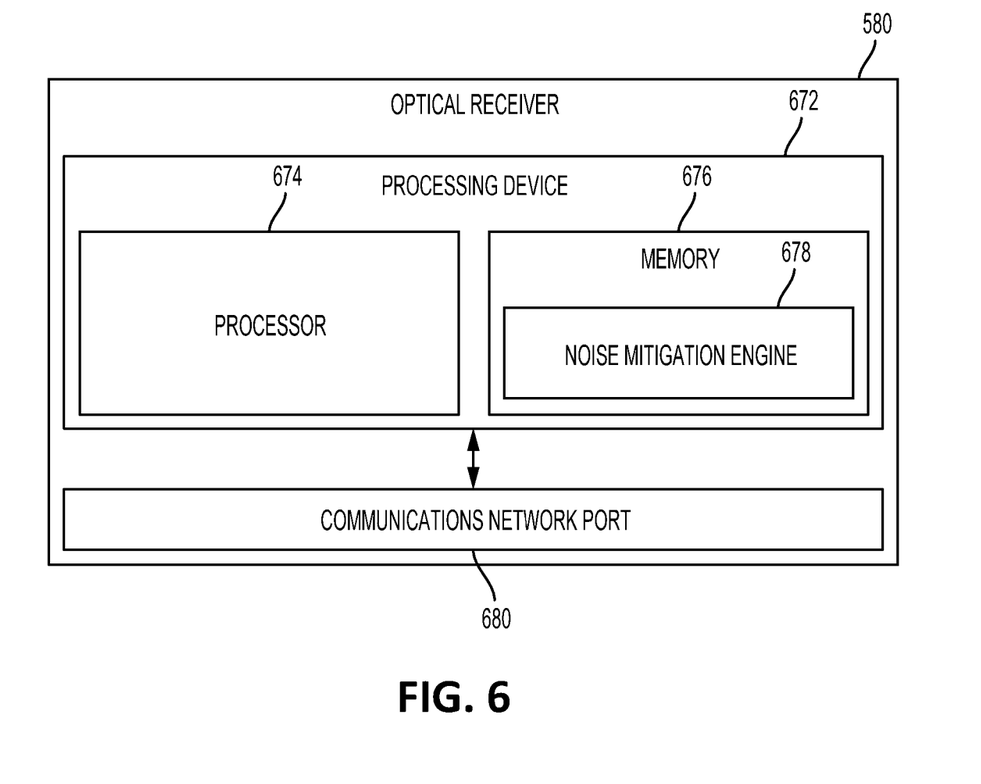
FIG. 6 is a block diagram of an example of an optical receiver including a processing device for use in distributed acoustic sensing system with a polarization control device for improving a signal-to-noise ratio according to one aspect of the present disclosure.

FIG. 6 depicts an example of the optical receiver 580 in FIG. 5. The optical receiver 580 can include a processing device 672 and a communications network port 680. The processing device 672 can include any number of processors 674 configured for executing program code stored in memory 676. Examples of the processing device 672 can include a microprocessor, an application-specific integrated circuit ("ASIC"), a field-programmable gate array ("FPGA"), or other suitable processor. In some aspects, the processing device 672 can be a dedicated processing device used determining data about an environment of the wellbore by processing distinct demodulated signals to compensate for noise in one of the demodulated signals. In additional or alternative aspects, the processing device 672 can perform additional functions. In some examples, the processing device 672 can be communicatively coupled to (or included in) a DAS for determining a flow rate of treatment fluid through a perforation based on acoustics generated in the wellbore. In additional or alternative examples, the processing device 672 can determine a pumping schedule for a hydraulic fracturing process and communicate with a pump to perform the operation.

The processing device 672 can include (or be communicatively coupled with) a non-transitory computer-readable memory 676. The memory 676 can include one or more memory device that can store program instructions. The program instructions can include for example, a noise mitigation engine 678 that is executable by the processing device 672 to perform certain operations described herein.

The operations can include determining data about an environment of a wellbore by processing data from more than one de-correlated demodulated signal to compensate for noise in one of the demodulated signals. In some aspects, the processing device 672 can receive, via the communications network port 680, a first demodulated signal from a first interferometer. The first demodulated signal can be based on a first delayed signal and a first non-delayed signal. The first delayed signal and the first non-delayed signal can have been formed based on a backscattered signal received from a sensing fiber that extends into the wellbore. The processing device 672 can also receive, via the communications network port 680, a second demodulated signal from a second interferometer. The second demodulated signal can be based on a second delayed signal and a second non-delayed signal formed from the backscattered signal. In additional or alternative aspects, the processing device 672 can receive, via the communications network port 680, data based on the first demodulated signal and the second demodulated signal.

In some aspects, the first delayed signal may have a different polarization than the first non-delayed signal and the second delayed signal can have the same polarization as the second non-delayed signal such that the first demodulated signal is de-correlated from the second demodulated signal. The operations can include the processing device 672 causing the polarization control device to shift the polarity of the first delayed signal or the first non-delayed signal.

In additional or alternative aspects, the operations can include the processing device 672 determining a signal-to-noise ratio for each of the de-correlated demodulated signals. In some examples, the processing device 672 can determine the data about the environment of the wellbore based on the demodulated signal with a higher signal-to-noise ratio. In additional or alternative examples, the processing device 672 can determine the date about the environment of the wellbore based on averaging the demodulated signals using a weighted average. The weighted average can be determined based on the signal-to-noise ratio of each demodulated signal such that portions of each demodulated signal with a higher signal-to-noise ratio are given a higher weight.

Although the processing device 672 is depicted in FIG. 6 as included in the optical receiver 580, other implementations are possible. In some examples the processing device 672 is an independent component communicatively coupled to more than one interferometer or optical receiver.

Figure 7:
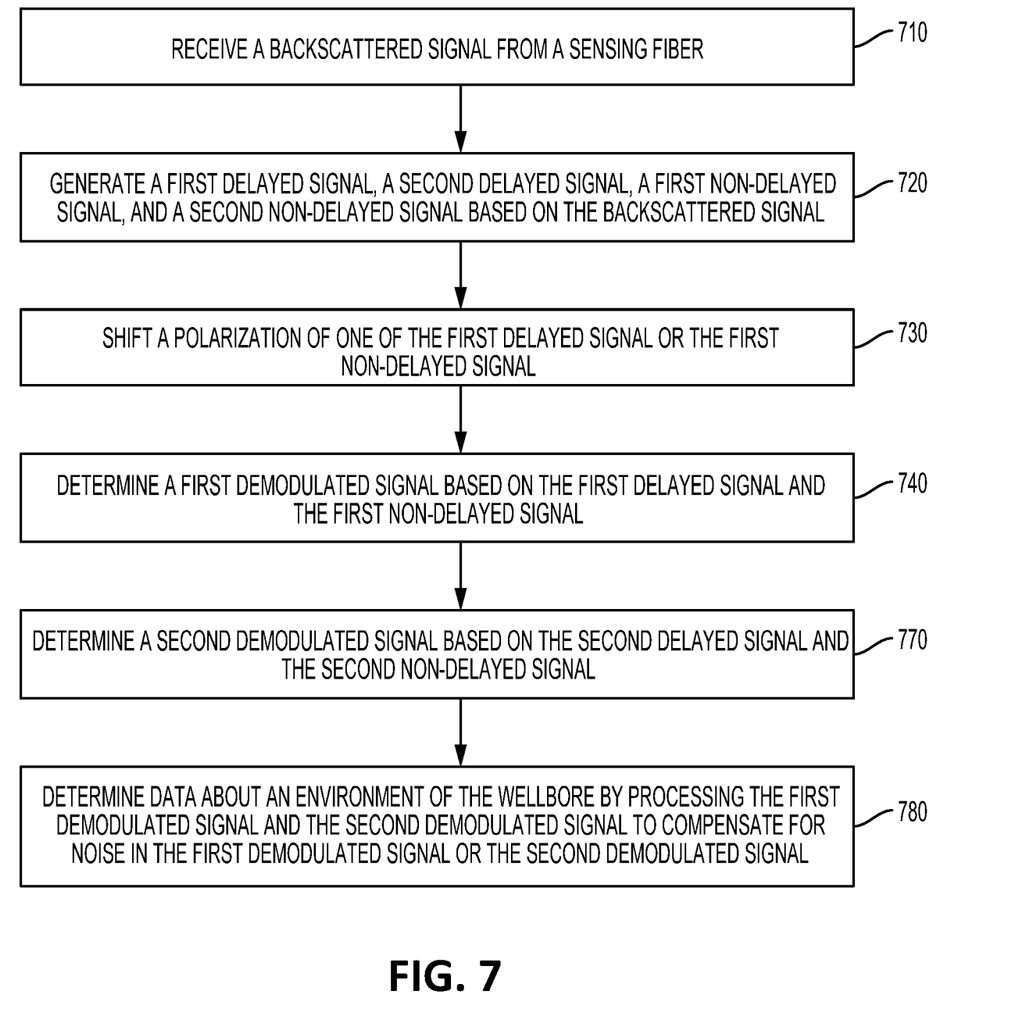
FIG. 7 is a flowchart of an example of a process for improving a signal-to-noise ratio in a distributed acoustic sensing system using a polarization control device according to one aspect of the present disclosure.

FIG. 7 is a flowchart of a process for improving a signal-to-noise ratio in a DAS using a polarization control device. The process can provide higher precision data about an environment of a wellbore.

In block 710, a backscattered signal can be received from a sensing fiber. The backscattered signal can be generated by an optical signal propagating through the sensing fiber. In some aspects, the optical signal may have been generated by an optical source (e.g., a laser) and a pulse generator. The sensing fiber can extend into a wellbore and include a single mode or a multimode optical fiber. The sensing fiber can behave as a series of sensors by generating backscattered light based on the optical signal and conditions of the environment of the wellbore. The backscattered light can be formed based on the optical signal backscattering at one or more points along the sensing fiber. The backscattered light at each of these points can have a different phase and can interfere with the optical signal as the backscattered light propagates towards the surface and the optical signal propagates deeper into the wellbore. At some points along the sensing fiber, the backscattered light will be in phase with the optical signal such that collision between the signals is constructive. At other points along the sensing fiber, the backscattered light will be out of phase with the optical signal such that collisions between the signals can cause fading.

In block 720, a first delayed signal, a second delayed signal, a first non-delayed signal, and a second non-delayed signal are generated from the backscattered signal. The backscattered signal can be received by a first splitter that can form a first signal and a second signal from the backscattered signal. In some examples, the first signal and the second signal can be copies of the backscattered signal each with half of the power. One output of the first splitter can be conductively coupled to a delay coil for delaying the first signal compared to the second signal. The output of the delay coil can be conductively coupled to a second splitter for forming the first delayed signal and the second delayed signal from the first signal. In some examples, the first signal and second signal can be copies of the first signal each with half of the power. The other output of the first splitter can be conductively coupled to a third splitter for forming the first non-delayed signal and the second non-delayed signal from the second signal. In some examples, the first non-delayed signal and the second non-delayed signal can be copies of the second signal each with half of the power. In additional or alternative examples, an amplifier can be conductively coupled between the sensing fiber and the first splitter for amplifying the backscattered signal to compensate for the reduction in power to each of the first delayed signal, the second delayed signal, the first non-delayed signal, and the second non-delayed signal caused by the splitters.

In block 730, a polarization of the first delayed signal or the first non-delayed signal is shifted by a polarization control device. The polarization control device can include a coil of fiber. As the first delayed signal or the first non-delayed signal propagates through the coiled fiber, the signal can experience birefringence, in which the optical signals can be split based on polarization into two rays taking different paths. In additional or alternative aspects, the polarization control device can include two lengths of polarization maintaining fiber spliced in different polarization orientation into the fiber lead such that an optical signal is split based on polarization into the different lengths of fiber.

In block 740, a first interferometer determines (e.g., by detecting) a first demodulated signal based on the first delayed signal having a shifted polarization and the first non-delayed signal. The first demodulated signal can be determined by processing the interference between the first delayed signal and the first non-delayed signal. In block 750, a second interferometer determines second demodulated signal based on the second delayed signal and the second non-delayed signal. The first demodulated signal can be de-correlated with the second demodulated signal in regards to a position of noise within the first demodulated signal. In some aspects, the first interferometer can include the second interferometer and the first demodulated signal and the second demodulated signal can be determined in series.

In block 760, a processing device determines data about an environment of the wellbore by processing the first demodulated signal and the second demodulated signal to compensate for noise in the first demodulated signal or the second demodulated signal. In some aspects, fading or noise can be present in different portions of the first demodulated signal as compared to the second demodulated signal. The processing device can analyze the first demodulated signal and the second demodulated signal to determine portions or channels of each signal that are faded by comparing a power value for the portion to a threshold value. In some examples, the processing device uses the demodulated signal with a lower percentage of faded portions to determine the data about the environment of the wellbore. In additional or alternative aspects, the processing device compares each portion of the first demodulated signal with each portion of the second demodulated signal and determines the data about the environment associated with each portion based on the demodulated signal with less fading in that portion.

In additional or alternative aspects, the processing device can sum the first demodulated signal and the second demodulated signal. Portions that are faded in the first demodulated signal can be compensated for by a lack of fading in an associated portion of the second demodulated signal. Portions that are faded in the second demodulated signal can be compensated for by a lack of fading in an associated portion of the first demodulated signal.

Although FIG. 7 depicts a process with a single backscattered signal, more than one backscattered signal can be received and processed substantially simultaneously to determine more accurate data about the environment of the wellbore. For example, more than one optical source can generate more than one optical signal. Each of the optical signals can be launched into the sensing fiber at substantially the same time. A backscattered signal can be generated by each optical signal as the optical signals propagate through the sensing fiber. The backscattered signals can be received by one or more compensators, which can split each of the backscattered signals to create de-correlated demodulated signals. The processing device can process each of the de-correlated demodulated signals based on one or more backscattered signals to determine data about the environment of the wellbore.

In some aspects, a DAS with a polarization control device for improving a signal-to-noise ratio is provided according to one or more of the following examples:

Example #1

A method can include receiving a backscattered signal from a sensing fiber extending into a wellbore. The backscattered signal can be based on an optical signal launched into the sensing fiber. The method can further include generating a first delayed signal, a second delayed signal, a first non-delayed signal, and a second non-delayed signal from the backscattered signal. The method can further include shifting, by a polarization control device, a polarization of the first delayed signal or the first non-delayed signal. The method can further include determining a first demodulated signal based on the first delayed signal and the first non-delayed signal. The first delayed signal or the first non-delayed signal can have a shifted polarization. The method can further include determining a second demodulated signal based on the second delayed signal and the second non-delayed signal. The method can further include determining data about an environment of the wellbore by processing the first demodulated signal and the second demodulated signal to compensate for noise in the first demodulated signal or the second demodulated signal.

Example #2

The method of Example #1, can further feature determining the first demodulated signal including detecting, by a first interferometer, the first demodulated signal. Determining the second demodulated signal can include detecting, by a second interferometer, the second demodulated signal having noise that is de-correlated with noise in the first demodulated signal.

Example #3

The method of Example #1, can further feature determining the data about the environment of the wellbore including averaging the first demodulated signal and the second demodulated signal using a weighted average. The first demodulated signal and the second demodulated signal can be assigned weights based on a signal-to-noise ratio of the first demodulated signal and a signal-to-noise ratio of the second demodulated signal.

Example #4

The method of Example #1, can further feature determining the data about the environment of the wellbore including determining first data about the environment of a segment of the wellbore based on a first portion of the first demodulated signal associated with the segment of the wellbore or a second portion of the second demodulated signal associated with the segment of the wellbore based on comparing a signal-to-noise ratio of the first portion and a signal-to-noise ratio of the second portion.

Example #5

The method of Example #1, can further feature determining the data about the environment of the wellbore including processing the first demodulated signal and the second demodulated signal to obtain a signal-to-noise ratio of 2 to 3 dBs greater than the first demodulated signal or the second demodulated signal.

Example #6

The method of Example #1, can further feature generating the first delayed signal, the second delayed signal, the first non-delayed signal, and the second non-delayed signal including splitting, by a first splitter, the backscattered signal into a first signal and a second signal. Generating the first delayed signal, the second delayed signal, the first non-delayed signal, and the second non-delayed signal can further include generating, by a delay coil, a time delay in the first signal compared to the second signal. Generating the first delayed signal, the second delayed signal, the first non-delayed signal, and the second non-delayed signal can further include splitting, by a second splitter, the first signal into the first delayed signal and the second delayed signal. Generating the first delayed signal, the second delayed signal, the first non-delayed signal, and the second non-delayed signal can further include splitting, by a third splitter, the second signal into the first non-delayed signal and the second non-delayed signal.

Example #7

The method of Example #6, can further feature generating the first delayed signal, the second delayed signal, the first non-delayed signal, and the second non-delayed signal including amplifying the backscattered signal to compensate for a reduction in power of the first delayed signal, the second delayed signal, the first non-delayed signal, and the second non-delayed signal compared to the backscattered signal.

Example #8

The method of Example #1, can further feature receiving the backscattered signal from the sensing fiber extending into the wellbore including receiving one or more additional backscattered signals from the sensing fiber at substantially the same time as the backscattered signal. Determining the data about the environment of the wellbore can include processing the first demodulated signal, the second demodulated signal, and additional demodulated signals based on the one or more additional backscattered signals to compensate for noise in the first demodulated signal, the second demodulated signal, and the additional demodulated signals. The additional demodulated signals can be de-correlated with the first demodulated signal and the second demodulated signal.

Example #9

A system can include a polarization control device, a first interferometer, and a second interferometer. The polarization control device can be communicatively coupled to a sensing fiber that can extend into a wellbore for shifting a polarization of a first version of a backscattered signal received from the sensing fiber. The first interferometer can be communicatively coupled to the polarization control device for detecting a first demodulated signal based on the first version of the backscattered signal and a second version of the backscattered signal having a different polarization than the first version of the backscattered signal. At least one of the first version of the backscattered signal or the second version of the backscattered signal can have a time delay. The second interferometer can be communicatively coupled to the sensing fiber for detecting a second demodulated signal based on a third version of the backscattered signal and a fourth version of the backscattered signal having the same polarization as the third version of the backscattered signal and a time delay. The first demodulated signal can be used with the second demodulated signal to determine data about an environment of the wellbore by processing the first demodulated signal and the second demodulated signal to compensate for noise in the first demodulated signal or the second demodulated signal.

Example #10

The system of Example #9, can further include an optical source and an optical receiver. The optical source can be coupled to the sensing fiber for generating an optical signal and launching the optical signal into the sensing fiber. The optical receiver can be communicatively coupled to the first interferometer and the second interferometer for determining the data based on the first demodulated signal and the second demodulated signal.

Example #11

The system of Example #10, can further feature the optical receiver including a processing device for determining a first signal-to-noise ratio of the first demodulated signal, a second signal-to-noise ratio of the second demodulated signal, and processing the first demodulated signal and the second demodulated signal to compensate for noise in the first demodulated signal or the second demodulated signal by comparing the first signal-to-noise ratio and the second signal-to-noise ratio.

Example #12

The system of Example #11, can further feature the optical receiver including the processing device for further assigning a weight to the first demodulated signal based on the first signal-to-noise ratio, for assigning a weight to the second demodulated signal based on the second signal-to-noise ratio, and for determining the data based on averaging the first demodulated signal with the second demodulated signal using a weighted average.

Example #13

The system of Example #9, can further include a first splitter, a delay coil, a second splitter, and a third splitter. The first splitter can be communicatively coupled to the sensing fiber for splitting the backscattered signal into a first signal and a second signal. The delay coil can be communicatively coupled to the first splitter for forming a first delayed signal from the first signal. The second splitter can be communicatively coupled to the delay coil for splitting the first delayed signal into the first version of the backscattered signal and the third version of the backscattered signal. The third splitter can be communicatively coupled to the first splitter for splitting the second signal into the second version of the backscattered signal and the fourth version of the backscattered signal.

Example #14

The system of Example #13, can further include an amplifier. The amplifier can be communicatively coupled between the sensing fiber and the first splitter for amplifying the backscattered signal to compensate for a reduction in power of the first version of the backscattered signal. The second version of the backscattered signal, the third version of the backscattered signal, and the fourth version of the backscattered signal can be on the splitters.

Example #15

The system of Example #9, can feature the polarization control device being a first polarization control device of a plurality of polarization control devices. The system can further include a plurality of polarization control devices and a plurality of additional interferometers. The plurality of polarization control devices can be for shifting a plurality of versions of the backscattered signal. Each additional interferometer of the plurality of additional interferometers for detecting an additional de-correlated demodulated signal based on a time-delayed version of a plurality of time-delayed versions of the backscattered signal and a non-delayed version of a plurality of non-delayed versions of the backscattered signal. The time-delayed version of the backscattered signal can have a different polarization than the non-delayed version of the backscattered signal. The additional de-correlated demodulated signal can be used with the first demodulated signal and the second demodulated signal to determine the data about the environment of the wellbore by processing the first demodulated signal, the second demodulated signal, and the additional de-correlated demodulated signal to compensate for noise in the first demodulated signal, the second demodulated signal, and the additional de-correlated demodulated signal.

Example #16

The system of Example #10, can further feature the polarization control device including a polarization scrambler. The polarization scrambler can include a coil of fiber for inducing stress on the fiber to cause birefringence.

Example #17

A non-transitory computer-readable medium in which instructions are stored. The instructions can be executed by a processing device for causing the processing device to receive a first demodulated signal based on a first delayed signal and a first non-delayed signal. The first delayed signal and the first non-delayed signal can be formed from a backscattered signal that can be generated in a sensing fiber that can extend into a wellbore. The first delayed signal or the first non-delayed signal can be shifted in polarization by a polarization control device. The instructions can further cause the processing device to receive a second demodulated signal based on a second delayed signal and a second non-delayed signal formed from the backscattered signal. The second delayed signal and the second non-delayed signal can be formed from the backscattered signal. The second delayed signal can have the same polarization as the second non-delayed signal. The instructions can further cause the processing device to determine data about an environment of the wellbore by processing the first demodulated signal and the second demodulated signal to compensate for noise in one or more of the first demodulated signal and the second demodulated signal.

Example #18

The non-transitory computer-readable medium of Example #17, can further include instructions for causing the processing device to cause the polarization control device to shift the polarization of one of the first delayed signal and the first non-delayed signal such that the first demodulated signal is de-correlated, in regard to noise, as compared to the second demodulated signal.

Example #19

The non-transitory computer-readable medium of Example #17, can further feature the instructions for causing the processing device to determine the data about the environment of the wellbore further causing the processing device to determine a first signal-to-noise ratio of the first demodulated signal. The instructions for causing the processing device to determine the data about the environment of the wellbore can further cause the processing device to determine a second signal-to-noise ratio of the second demodulated signal. The instructions for causing the processing device to determine the data about the environment of the wellbore can further cause the processing device to average the first demodulated signal with the second demodulated signal based on the first signal-to-noise ratio and the second signal-to-noise ratio.

Example #20

The non-transitory computer-readable medium of Example #19, can further feature the instructions for causing the processing device to average the first demodulated signal with the second causing the processing device to partition the first demodulated signal and the second demodulated signal into portions associated with segments of the wellbore. The instructions for causing the processing device to average the first demodulated signal with the second can further cause the processing device to assign a weight to each portion based on the signal-to-noise ratio of the portion. The instructions for causing the processing device to average the first demodulated signal with the second can further cause the processing device to average the first demodulated signal and the second demodulated signal to determine an averaged signal using a weighted average. The instructions for causing the processing device to average the first demodulated signal with the second can further cause the processing device to determine the data about the environment based on the averaged signal.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
receiving a backscattered signal from a sensing fiber extending into a wellbore, the backscattered signal being based on an optical signal launched into the sensing fiber;
generating a first delayed signal, a second delayed signal, a first non-delayed signal, and a second non-delayed signal from the backscattered signal;
shifting, by a polarization control device, a polarization of the first delayed signal or the first non-delayed signal;
determining a first demodulated signal based on the first delayed signal and the first non-delayed signal, the first delayed signal or the first non-delayed signal having a shifted polarization;
determining a second demodulated signal based on the second delayed signal and the second non-delayed signal;
determining data about an environment of the wellbore by processing the first demodulated signal and the second demodulated signal to compensate for noise in the first demodulated signal or the second demodulated signal.

2. The method of claim 1, wherein determining the first demodulated signal comprises detecting, by a first interferometer, the first demodulated signal,
wherein determining the second demodulated signal comprises detecting, by a second interferometer, the second demodulated signal having noise that is de-correlated with noise in the first demodulated signal.

3. The method of claim 1, wherein determining the data about the environment of the wellbore comprises averaging the first demodulated signal and the second demodulated signal using a weighted average, the first demodulated signal and the second demodulated signal being assigned weights based on a signal-to-noise ratio of the first demodulated signal and a signal-to-noise ratio of the second demodulated signal.

4. The method of claim 1, wherein determining the data about the environment of the wellbore comprises determining first data about the environment of a segment of the wellbore based on a first portion of the first demodulated signal associated with the segment of the wellbore or a second portion of the second demodulated signal associated with the segment of the wellbore based on comparing a signal-to-noise ratio of the first portion and a signal-to-noise ratio of the second portion.

5. The method of claim 1, wherein determining the data about the environment of the wellbore comprises processing the first demodulated signal and the second demodulated signal to obtain a signal-to-noise ratio of 2 to 3 dBs greater than the first demodulated signal or the second demodulated signal.

6. The method of claim 1, wherein receiving the backscattered signal from the sensing fiber extending into the wellbore comprises receiving one or more additional backscattered signals from the sensing fiber at substantially the same time as the backscattered signal,
wherein determining the data about the environment of the wellbore comprises processing the first demodulated signal, the second demodulated signal, and additional demodulated signals based on the one or more additional backscattered signals to compensate for noise in the first demodulated signal, the second demodulated signal, and the additional demodulated signals, the additional demodulated signals being de-correlated with the first demodulated signal and the second demodulated signal.

7. The method of claim 1, wherein generating the first delayed signal, the second delayed signal, the first non-delayed signal, and the second non-delayed signal comprises:
splitting, by a first splitter, the backscattered signal into a first signal and a second signal;
generating, by a delay coil, a time delay in the first signal compared to the second signal;
splitting, by a second splitter, the first signal into the first delayed signal and the second delayed signal; and
splitting, by a third splitter, the second signal into the first non-delayed signal and the second non-delayed signal.

8. The method of claim 7, wherein generating the first delayed signal, the second delayed signal, the first non-delayed signal, and the second non-delayed signal comprises amplifying the backscattered signal to compensate for a reduction in power of the first delayed signal, the second delayed signal, the first non-delayed signal, and the second non-delayed signal compared to the backscattered signal.

9. A system comprising:
a polarization control device communicatively coupleable to a sensing fiber extendable into a wellbore for shifting a polarization of a first version of a backscattered signal received from the sensing fiber;
a first interferometer communicatively coupleable to the polarization control device for detecting a first demodulated signal based on the first version of the backscattered signal and a second version of the backscattered signal having a different polarization than the first version of the backscattered signal, at least one of the first version of the backscattered signal or the second version of the backscattered signal having a time delay; and
a second interferometer communicatively coupleable to the sensing fiber for detecting a second demodulated signal based on a third version of the backscattered signal and a fourth version of the backscattered signal having the same polarization as the third version of the backscattered signal and a time delay, the first demodulated signal being usable with the second demodulated signal to determine data about an environment of the wellbore by processing the first demodulated signal and the second demodulated signal to compensate for noise in the first demodulated signal or the second demodulated signal.

10. The system of claim 9, wherein the polarization control device is a first polarization control device of a plurality of polarization control devices, the system further comprising:

the plurality of polarization control devices for shifting a plurality of versions of the backscattered signal; and a plurality of additional interferometers, each additional interferometer of the plurality of additional interferometers for detecting an additional de-correlated demodulated signal based on a time-delayed version of a plurality of time-delayed versions of the backscattered signal and a non-delayed version of a plurality of non-delayed versions of the backscattered signal, the time-delayed version of the backscattered signal having a different polarization than the non-delayed version of the backscattered signal, the additional de-correlated demodulated signal being usable with the first demodulated signal and the second demodulated signal to determine the data about the environment of the wellbore by processing the first demodulated signal, the second demodulated signal, and the additional de-correlated demodulated signal to compensate for noise in the first demodulated signal, the second demodulated signal, and the additional de-correlated demodulated signal.

11. The system of claim 9, further comprising:

a first splitter communicatively coupleable to the sensing fiber for splitting the backscattered signal into a first signal and a second signal;

a delay coil communicatively coupleable to the first splitter for forming a first delayed signal from the first signal;

a second splitter communicatively coupleable to the delay coil for splitting the first delayed signal into the first version of the backscattered signal and the third version of the backscattered signal; and a third splitter communicatively coupleable to the first splitter for splitting the second signal into the second version of the backscattered signal and the fourth version of the backscattered signal.

12. The system of claim 11, further comprising:

an amplifier communicatively coupleable between the sensing fiber and the first splitter for amplifying the backscattered signal to compensate for a reduction in power of the first version of the backscattered signal, the second version of the backscattered signal, the third version of the backscattered signal, and the fourth version of the backscattered signal based on the splitters.

13. The system of claim 9, further comprising:

an optical source coupleable to the sensing fiber for generating an optical signal and launching the optical signal into the sensing fiber; and an optical receiver communicatively coupleable to the first interferometer and the second interferometer for determining the data based on the first demodulated signal and the second demodulated signal.

14. The system of claim 13, wherein the polarization control device comprises a polarization scrambler including a coil of fiber for inducing stress on the fiber to cause birefringence.

15. The system of claim 13, wherein the optical receiver comprises a processing device for determining a first signal-to-noise ratio of the first demodulated signal, a second signal-to-noise ratio of the second demodulated signal, and processing the first demodulated signal and the second demodulated signal to compensate for noise in the first demodulated signal or the second demodulated signal by comparing the first signal-to-noise ratio and the second signal-to-noise ratio.

16. The system of claim 15, wherein the optical receiver comprises the processing device for further assigning a weight to the first demodulated signal based on the first signal-to-noise ratio, for assigning a weight to the second demodulated signal based on the second signal-to-noise ratio, and for determining the data based on averaging the first demodulated signal with the second demodulated signal using a weighted average.

17. A non-transitory computer-readable medium in which instructions are stored, the instructions being executable by a processing device for causing the processing device to:

receive a first demodulated signal based on a first delayed signal and a first non-delayed signal, the first delayed signal and the first non-delayed signal formed from a backscattered signal generatable in a sensing fiber extendable into a wellbore, the first delayed signal or the first non-delayed signal being shifted in polarization by a polarization control device;

receive a second demodulated signal based on a second delayed signal and a second non-delayed signal formed from the backscattered signal, the second delayed signal and the second non-delayed signal formed from the backscattered signal and the second delayed signal having the same polarization as the second non-delayed signal; and determine data about an environment of the wellbore by processing the first demodulated signal and the second demodulated signal to compensate for noise in one or more of the first demodulated signal and the second demodulated signal.

18. The non-transitory computer-readable medium of claim 17, wherein the instructions are further for causing the processing device to cause the polarization control device to shift the polarization of one of the first delayed signal and the first non-delayed signal such that the first demodulated signal is de-correlated, in regard to noise, as compared to the second demodulated signal.

19. The non-transitory computer-readable medium of claim 17, wherein the instructions for causing the processing device to determine the data about the environment of the wellbore further comprises causing the processing device to:

determine a first signal-to-noise ratio of the first demodulated signal;

determine a second signal-to-noise ratio of the second demodulated signal; and average the first demodulated signal with the second demodulated signal based on the first signal-to-noise ratio and the second signal-to-noise ratio.

20. The non-transitory computer-readable medium of claim 19, wherein the instructions for causing the processing device to average the first demodulated signal with the second comprises causing the processing device to:

partition the first demodulated signal and the second demodulated signal into portions associated with segments of the wellbore;

assign a weight to each portion based on the signal-to-noise ratio of the portion;

average the first demodulated signal and the second demodulated signal to determine an averaged signal using a weighted average; and determine the data about the environment based on the averaged signal.

* * * * *